(12) United States Patent
Nakagawara

(10) Patent No.: US 8,643,352 B2
(45) Date of Patent: Feb. 4, 2014

(54) SWITCHING POWER SUPPLY CONTROL WITH REDUCED HARMONIC FREQUENCY FLUCTUATIONS

(75) Inventor: Chikashi Nakagawara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 355 days.

(21) Appl. No.: 12/884,128

(22) Filed: Sep. 16, 2010

(65) Prior Publication Data

US 2011/0156681 A1 Jun. 30, 2011

(30) Foreign Application Priority Data

Dec. 28, 2009 (JP) ................................ 2009-297980

(51) Int. Cl.
G05F 1/575 (2006.01)

(52) U.S. Cl.
USPC ............ 323/283; 323/222; 323/271; 323/285

(58) Field of Classification Search
USPC .......................... 323/222, 271, 282, 283, 285
See application file for complete search history.

(56) References Cited

U.S. PATENT DOCUMENTS

| | | | | |
|---|---|---|---|---|
| 5,949,229 A | * | 9/1999 | Choi et al. | 323/320 |
| 6,100,677 A | * | 8/2000 | Farrenkopf | 323/285 |
| 6,366,070 B1 | * | 4/2002 | Cooke et al. | 323/284 |
| 7,358,706 B2 | * | 4/2008 | Lys | 323/222 |
| 7,541,795 B1 | * | 6/2009 | Smith et al. | 323/285 |
| 7,737,668 B2 | * | 6/2010 | Oswald et al. | 323/259 |
| 7,759,911 B2 | * | 7/2010 | Omi | 323/222 |
| 7,893,678 B2 | * | 2/2011 | Blanken | 323/285 |
| 7,990,121 B2 | * | 8/2011 | Kojima et al. | 323/282 |
| 8,004,263 B2 | * | 8/2011 | Hirata et al. | 323/285 |
| 8,237,417 B2 | * | 8/2012 | Miyamae | 323/259 |
| 8,305,055 B2 | * | 11/2012 | Wu et al. | 323/259 |
| 2005/0035748 A1 | * | 2/2005 | Inn | 323/285 |
| 2009/0302820 A1 | * | 12/2009 | Shimizu et al. | 323/285 |
| 2010/0201336 A1 | * | 8/2010 | Chen et al. | 323/285 |
| 2011/0156681 A1 | * | 6/2011 | Nakagawara | 323/283 |
| 2011/0291634 A1 | * | 12/2011 | Takata et al. | 323/285 |

FOREIGN PATENT DOCUMENTS

| | | |
|---|---|---|
| JP | 2003-299350 | 10/2003 |
| JP | 2005-218166 | 8/2005 |
| JP | 2008-263714 | 10/2008 |

* cited by examiner

*Primary Examiner* — Jeffrey Sterrett
(74) *Attorney, Agent, or Firm* — Patterson & Sheridan, LLP

(57) ABSTRACT

According to embodiments, a switching power supply control apparatus causes a switching element to perform an ON/OFF once in each period of a clock signal, when an output voltage of a switching power supply formed by charging a capacitor with a current of a choke coil that stores/releases current energy in conjunction with the ON/OFF operation of the switching element is adjusted by exercising ON/OFF control of the switching element based on comparator output that compares the output voltage with a reference voltage.

17 Claims, 12 Drawing Sheets

SWITCHING POWER SUPPLY CONTROL WITH REDUCED HARMONIC FREQUENCY FLUCTUATIONS

CROSS-REFERENCE TO RELATED APPLICATIONS

This application is based upon and claims the benefit of priority from Japanese Patent Application No. 2009-297980, filed on Dec. 28, 2009; the entire contents of which are incorporated herein by reference.

FIELD

Embodiments described herein relate generally to a switching power supply control apparatus.

BACKGROUND

Pulse frequency modulation (PFM) method is known, in addition to pulse width modulation (PWM) method, as switching power supplies. A switching power supply of the PWM method adjusts the output voltage by controlling the ON/OFF time ratio (duty) of a switching element after obtaining comparator output by changing the threshold level of the comparator in accordance with an output voltage using a chopping wave signal synchronized with a clock. The switching power supply of the PWM method has widely been used, but is basically based on feedback control, which always poses a problem of stability (oscillation).

A switching power supply of the PFM method, by contrast, includes a choke coil that stores/releases current energy in conjunction with an ON/OFF operation of a switching element and a capacitor that forms an output voltage by charging and adjusts the output voltage by exercising the ON/OFF control of the switching element directly based on comparator output that compares the output voltage with a predetermined voltage and thus has advantageously no stability problem described above posed for the PWM method.

However, in a switching power supply of the PFM method, the switching element is in principle 100% duty that continues the ON operation in a period in which the output voltage is below the predetermined voltage and conversely 0% duty that continues the OFF operation in a period in which the output voltage is above the predetermined voltage. The former case occurs when the power supply is started up or a light load or no load is switched to a heavy load. The latter case occurs when a heavy load is switched to a light load or no load. That is, the switching power supply of the PFM method has a weakness that the switching frequency changes significantly when operating conditions change such as when the load abruptly changes.

Thus, there has been a problem that higher harmonics may not be efficiently be removed because, as described above, the fundamental frequency of the switching frequency changes significantly depending on operating conditions even if measures are taken such as exercising duty control in such a way that the switching frequency falls within a predetermined frequency range in which a frequency of generated higher harmonics thereof does not act as a disturbing wave to prevent disturbances by higher harmonics generated by the ON/OFF operation of a switching element or providing a harmonic suppressor filter.

DETAILED DESCRIPTION

In general, according to embodiments, a switching power supply control apparatus causes a switching element to perform an ON/OFF once in each period of a clock signal, when an output voltage of a switching power supply formed by charging a capacitor with a current of a choke coil that stores/releases current energy in conjunction with the ON/OFF operation of the switching element is adjusted by exercising ON/OFF control of the switching element based on comparator output that compares the output voltage with a reference voltage.

Switching power supply control apparatuses according to embodiments will be described below in detail with reference to appended drawings. However, the present invention is not limited by these embodiments.

Figure 1:
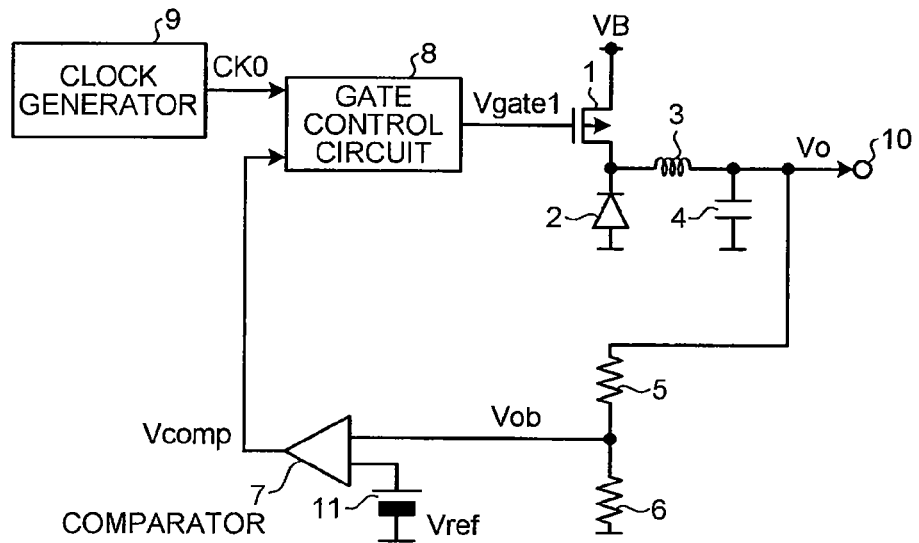
FIG. 1 is a block diagram showing a configuration example of a step-down switching power supply provided with a switching power supply control apparatus according to a first embodiment.

FIG. 1 is a block diagram showing a configuration example of a step-down switching power supply provided with a switching power supply control apparatus according to the first embodiment. In FIG. 1, the step-down switching power supply provided with the switching power supply control apparatus according to the first embodiment includes a PMOS transistor 1, a diode 2, a choke coil 3, a capacitor 4 for smoothing, a series circuit of resistors 5 and 6 constituting a voltage divider, a comparator 7, a gate control circuit 8, and a clock generator 9. The PMOS transistor 1 and the diode 2 correspond to first and second switching elements respectively.

Connection relations of these will be described. In FIG. 1, the PMOS transistor 1 has a DC power supply (for example, a secondary battery) VB connected to a source terminal and a cathode terminal of the diode 2 and one end of the choke coil 3 connected to a drain terminal. An anode terminal of the diode 2 is connected to the ground and the other end of the choke coil 3 is connected to an output terminal 10. The ground is a power supply defining 0 V to be the reference voltage. In the present embodiment, the anode terminal of the diode 2 is grounded as it is called, but any method other than grounding that defines 0 V may be adopted.

The capacitor 4 and the series circuit of the resistors 5 and 6 are each provided between a connection line of the other end of the choke coil 3 and the output terminal 10 and the ground in parallel. The series circuit of the resistors 5 and 6 outputs the voltage across the capacitor 4, that is, a divided voltage Vob of an output voltage Vo arising at the output terminal 10.

In the comparator 7, the divided voltage Vob is input to one input terminal and a reference voltage Vref to the other input terminal from a voltage source 11. An output (comparison result) Vcomp of the comparator 7 is input to one input terminal of the gate control circuit 8. A clock signal CK0 from the clock generator 9 is input to the other input terminal of the gate control circuit 8. An output (gate control signal) Vgate1 of the gate control circuit 8 is input to a gate terminal of the PMOS transistor 1.

To make an understanding of the first embodiment easier, a basic operation of the step-down switching power supply shown in FIG. 1 will briefly be described while ignoring the gate control circuit 8 according to the first embodiment. The basic operation is an operation that if the PMOS transistor 1 repeats the ON operation and OFF operation of a predetermined time, the output voltage Vo of a predetermined value produced by stepping down the voltage of the DC power supply VB is obtained at the output terminal 10.

To realize the basic operation, the PMOS transistor 1 should perform the ON operation while the comparison result Vcomp of the comparator 7 shows that the divided voltage Vob<reference voltage Vref holds and the OFF operation while the comparison result Vcomp shows that the divided voltage Vob>reference voltage Vref holds. Then, the operations shown below will be performed in the ON operation time and OFF operation time of the PMOS transistor 1.

In the ON operation time of the PMOS transistor 1, the current flows in the direction of the DC power supply VB→PMOS transistor 1→the choke coil 3→the output terminal 10. Current energy is stored in the choke coil 3 and at the same time, power is supplied from the output terminal 10. In this process, the capacitor 4 is charged and the voltage across the capacitor 4, that is, the output voltage Vo arising at the output terminal 10 rises toward the voltage value of the DC power supply VB.

When the PMOS transistor 1 performs the OFF operation, the potential of a current input terminal of the choke coil 3 falls to or below the ground potential to maintain the current value immediately before. Accordingly, the diode 2 performs the ON operation and the current flows in the direction of the ground→the diode 2→the choke coil 3→output terminal 10 in the OFF operation time of the PMOS transistor 1. Since the potential of the current input terminal of the choke coil 3 is lowered to or below the ground potential, the voltage across the capacitor 4, that is, the output voltage Vo arising at the output terminal 10 falls. The diode 2 works as described above and thus is called a flywheel diode.

However, a problem below arises when the control method according to which the PMOS transistor 1 is caused to perform the ON operation while the comparison result Vcomp of the comparator 7 shows the divided voltage Vob<the reference voltage Vref and the OFF operation while the comparison result Vcomp shows the divided voltage Vob>the reference voltage Vref is applied.

That is, if, for example, rising characteristics of the DC power supply VB are slow when a conversion operation is started by turning on the DC power supply VB, the time in which the divided voltage Vob is below the reference voltage Vref becomes longer, resulting in the PMOS transistor 1 continuing to perform the ON operation longer. If falling characteristics of the DC power supply VB are slow when the DC power supply VB is turned off after completing the conversion operation, the time in which the divided voltage Vob is above the reference voltage Vref becomes longer, resulting in the PMOS transistor 1 continuing to perform the OFF operation longer. Further, if the time in which the divided voltage Vob is above the reference voltage Vref is long when the load is light or there is no load, the PMOS transistor 1 may continue to perform the OFF operation longer. The above examples mean that when operating conditions change such as when the load abruptly changes, the switching frequency changes significantly.

Figure 2:
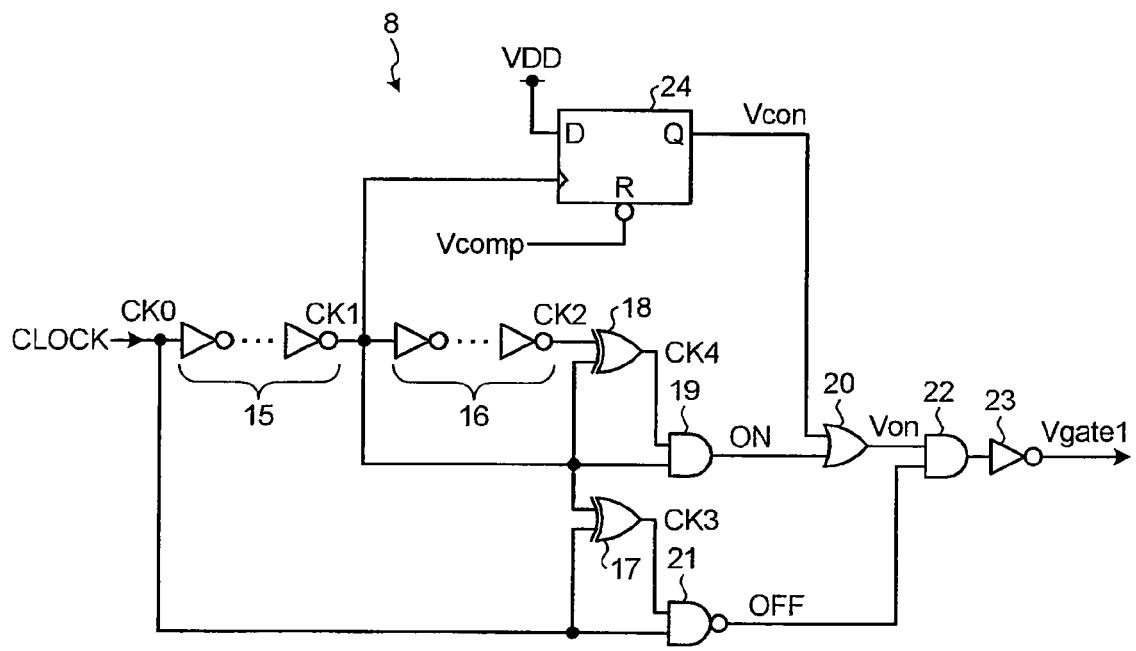
FIG. 2 is a circuit diagram showing a configuration example of a gate control circuit shown in FIG. 1.
Figure 3:
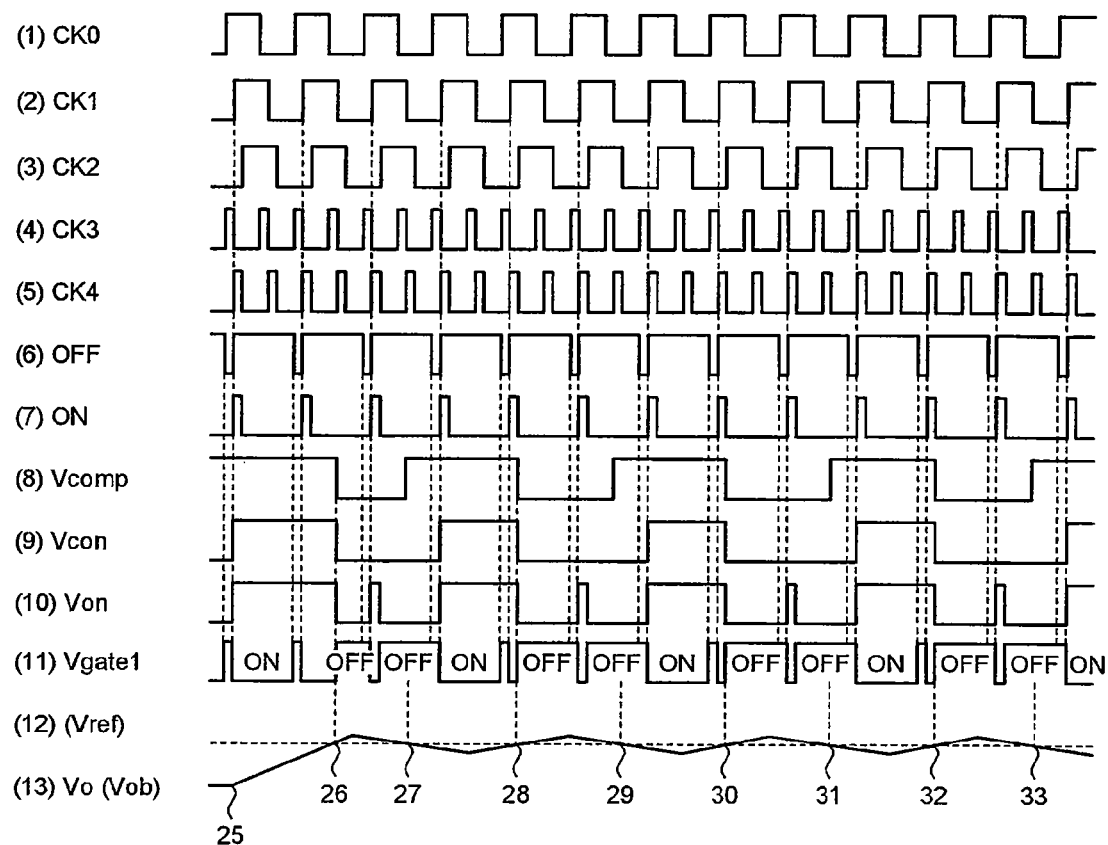
FIG. 3 is a timing chart illustrating operations of the gate control circuit shown in FIG. 1 having a configuration shown in FIG. 2.

Thus, in the first embodiment, the gate control circuit 8 is configured as shown, for example, in FIG. 2 and the PMOS transistor 1 is enabled to exercise ON/OFF control within a period of a signal level at which the comparison result Vcomp of the comparator 7 causes the PMOS transistor 1 to perform the ON operation and within a period of the signal level at which the comparison result Vcomp causes the PMOS transistor 1 to perform the OFF operation so that, as shown in FIG. 3, the switching frequency changes as little as possible even if operating conditions change such as when the load abruptly changes. FIG. 2 is a circuit diagram showing a configuration example of the gate control circuit shown in FIG. 1. FIG. 3 is a timing chart illustrating operations of the gate control circuit shown in FIG. 1 having the configuration shown in FIG. 2.

In FIG. 2, the gate control circuit 8 in the first embodiment is configured by, for example, serial two-stage delay circuits 15 and 16, exclusive OR circuits 17 and 18, an AND circuit 19, an OR circuit 20, a NOT-AND circuit 21, an AND circuit 22, a NOT circuit 23, and a flip-flop circuit 24.

The delay circuits 15 and 16 are each configured by connecting an even number (the same number) of NOT circuits in series. Thus, the delay circuits 15 and 16 have the same amount of delay. The amount of delay in the delay circuits 15 and 16 is determined by relations to the rise time during the ON operation of the PMOS transistor 1 and the fall time during the OFF operation.

Next, these operation of a switching power supply control apparatus according to the first embodiment provided with the gate control circuit 8 shown in FIG. 2 will be described. FIG. 3 will be referred to when appropriate.

The delay circuit 15 in the former stage outputs a clock signal CK1 (FIG. 3(2)) obtained by delaying a clock signal CK0 (FIG. 3(1)) from the clock generator 9 by a predetermined phase. The delay circuit 16 in the latter stage outputs a clock signal CK2 (FIG. 3(3)) obtained by delaying the clock signal CK1 (FIG. 3(2)) from the delay circuit 15 by a predetermined phase.

The exclusive OR circuit 17 calculates an exclusive OR of the clock signal CK0 (FIG. 3(1)) and the clock signal CK1 (FIG. 3(2)) to output a pulse signal CK3 (FIG. 3(4)) that is at a high level at a leading edge (a rising portion in the illustrated example) and a trailing edge (a falling portion in the illustrated example) of both clock signals only in a time of a phase difference of both. The exclusive OR circuit 18 calculates an exclusive OR of the clock signal CK1 (FIG. 3(2)) and the clock signal CK2 (FIG. 3(3)) to output a pulse signal CK4 (FIG. 3(5)) that is at a high level at the leading edge and the trailing edge of both clock signals only in a time of a phase difference of both.

The NOT-AND circuit 21 calculates a logical product of the clock signal CK0 (FIG. 3(1)) and the pulse signal CK3 (FIG. 3(4)) and logically inverts the logical product, which is output as a pulse signal OFF. The pulse signal OFF is a pulse signal that is, as shown in FIG. 3(6), at a low level only in a time of the phase difference from a start position (leading edge) in each period of the clock signal CK0 and then maintains a high level till an end position (the leading edge of the next clock signal CK0).

The AND circuit 19 calculates a logical product of the clock signal CK1 (FIG. 3(2)) and the pulse signal CK4 (FIG. 3(5)) and outputs the logical product as a pulse signal ON. The pulse signal ON is a pulse signal that is, as shown in FIG. 3(7), at a high level only in a time of the phase difference from the start position (leading edge) in each period of the clock signal CK1 and then maintains a low level till the end position (the leading edge of the next clock signal CK1).

The flip-flop circuit 24 has the voltage of operation power VDD input to an input terminal D, the clock signal CK1 (FIG. 3(2)) input to a clock terminal, a comparison result Vcomp (FIG. 3(8)) output by the comparator 7 input to a reset terminal R, and a signal Vcon (FIG. 3(9)) output from an output terminal Q.

The OR circuit 20 calculates a logical sum of the signal Vcon (FIG. 3(9)) output by the flip-flop circuit 24 and the pulse signal ON (FIG. 3(7)) and outputs the logical sum as a pseudo-comparison signal Von. The pseudo-comparison signal Von is a signal that changes, as shown in FIG. 3(10), to a high level at a rising edge of the clock signal CK1 in a period in which the comparison result Vcomp of the comparator 7 is at a high level, but in a period in which the comparison result Vcomp is at a low level, one pulse of the pulse signal ON appears.

The AND circuit 22 calculates a logical product of the pseudo-comparison signal Von (FIG. 3(10)) and the pulse signal OFF (FIG. 3(6)). The NOT circuit 23 logically inverts the output of the AND circuit 22 and outputs the calculation result as a gate control signal Vgate1. The NOT circuit 23 serves to shift the level of output voltage of the AND circuit 22 in accordance with the operating voltage of the PMOS transistor 1.

As a result, as shown in FIG. 3(11), a high level interval (denoted as "OFF") in which the PMOS transistor 1 is caused to perform the OFF operation and a low level interval (denoted as "ON") in which the PMOS transistor 1 is caused to perform the ON operation are alternately generated at predetermined intervals regardless of an interval in which the comparison result Vcomp (FIG. 3(8)) of the comparator 7 is at a high level or an interval in which the comparison result Vcomp is at a low level. That is, the gate control signal Vgate1 is a control signal that always causes the PMOS transistor 1 to perform the ON/OFF operation once in each period of the clock signal CK0. The voltage control operation according to the present embodiment will be described more concretely with reference to FIGS. 3(1) and 3(8) to 3(13).

FIG. 3(13) shows a change of the output voltage Vo after operating conditions are changed from a light load or no load to a heavy load in some timing 25, that is, the divided voltage Vob. Before the timing 25, the output voltage Vo (divided voltage Vob) is at the level of a predetermined value well below the predetermined voltage shown in FIG. 3(12), that is, the reference voltage Vref. Since Vref>Vob holds, the output (comparison result Vcomp) of the comparator 7 is at a high level (FIG. 3(8)) and the PMOS transistor 1 performs the ON operation at a rising edge of the clock signal CK1 and thus, the output voltage Vo (divided voltage Vob) at a bottom level thereof rises toward the predetermined voltage (reference voltage Vref) shown in FIG. 3(12). Since Vref>Vob holds till timing 26 when the output voltage Vo (divided voltage Vob) exceeds the predetermined voltage (reference voltage Vref) shown in FIG. 3(12), the output (comparison result Vcomp) of the comparator 7 is at a high level (FIG. 3(8)).

However, even if the output (comparison result Vcomp) of the comparator 7 is at a high level, the gate control signal Vgate1 is not generated in such a way that the PMOS transistor 1 is caused to continue the ON operation in a period thereof and instead, the gate control signal Vgate1 is generated in such a way that the PMOS transistor 1 is caused to perform the ON/OFF operation in one period of the clock signal CK0 (FIG. 3(11)).

After the timing 26, control is exercised while the output voltage Vo (divided voltage Vob) fluctuates above or below the predetermined voltage (reference voltage Vref). As shown in FIGS. 3(8) and 3(13), Vref<Vob holds in each of a period between the timing 26 and timing 27, a period between timing 28 and timing 29, a period between timing 30 and timing 31, and a period between timing 32 and timing 33 and thus, the comparison result Vcomp of the comparator 7 is at a low level. Vref>Vob holds in each of a period between the timing 27 and the timing 28, a period between the timing 29 and the timing 30, and a period between the timing 31 and the timing 32 and thus, the comparison result Vcomp of the comparator 7 is at a high level.

However, the gate control signal Vgate1 is not generated in such a way that the PMOS transistor 1 is caused to continue the ON operation/OFF operation in each period regardless of a period in which the comparison result Vcomp of the comparator 7 is at a high level or a period in which the comparison result Vcomp is at a low level and instead, the gate control signal Vgate1 is generated in such a way that the PMOS transistor 1 is caused to perform the ON/OFF operation in each period of the clock signal CK0 (FIG. 3(11)).

In other words, regardless of the length of each of a period in which the comparison result Vcomp of the comparator 7 is at a high level or a period in which the comparison result Vcomp is at a low level, the gate control signal Vgate1 is generated in such a way that the PMOS transistor 1 is always caused to perform the OFF operation and the ON operation in each period of the clock signal CK0, though operation time widths are different.

Thus, according to the present embodiment, a switching element (PMOS transistor) can always be caused to perform the ON/OFF operation in each period of a clock signal regardless of the state of comparator output in a period from the start to the end of a voltage conversion operation (step-down operation) under certain conditions and therefore, a situation in which the ON operation time or OFF operation time will continue does not arise even if operating conditions change such as when operating conditions are changed from a heavy load to a light load or no load, or rising characteristics or falling characteristics of a used DC power supply are slow so that fluctuations in switching frequency can significantly be reduced. Consequently, fluctuations of generated harmonic frequencies decrease so that a step-down switching power supply from which higher harmonics is easily removable can be configured.

Figure 4:
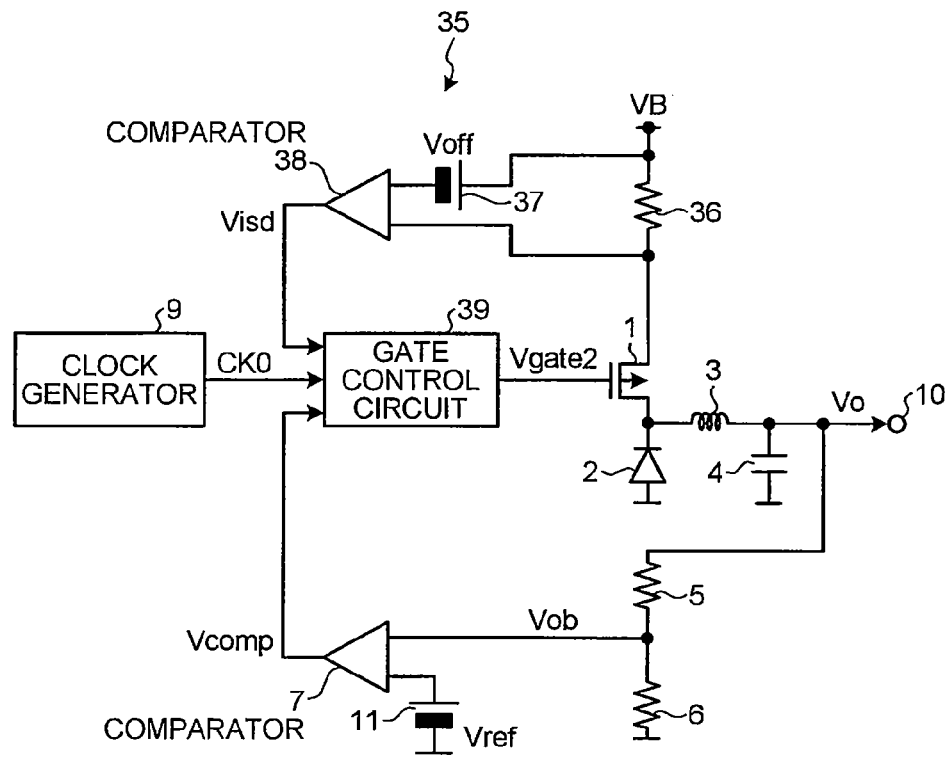
FIG. 4 is a block diagram showing a configuration example of the step-down switching power supply provided with the switching power supply control apparatus according to a second embodiment.

FIG. 4 is a block diagram showing a configuration example of the step-down switching power supply provided with the switching power supply control apparatus according to the second embodiment. In the second embodiment, a configuration example in which an overcurrent detection circuit to prevent burning of a choke coil caused by an excessive current is provided is shown. In FIG. 4, the same numerals are attached to components identical to or equivalent to those shown in FIG. 1 (first embodiment). Here, the description focuses on a portion related to the second embodiment.

In FIG. 4, an overcurrent detection circuit 35 includes an overcurrent detection resistor 36, an offset voltage generator 37, and a comparator 38. The overcurrent detection resistor 36 is provided between the DC power supply VB and a source terminal of the PMOS transistor 1. One input terminal of the comparator 38 is connected to the connection line of the DC power supply VB and the overcurrent detection resistor 36 via the offset voltage generator 37 and the other input terminal to the connection line of the overcurrent detection resistor 36 and the source terminal of the PMOS transistor 1.

The comparator 38 compares the voltage across the overcurrent detection resistor 36 with an offset voltage Voff generated by the offset voltage generator 37 and outputs an overcurrent detection signal Visd. If the voltage across the overcurrent detection resistor 36 does not exceed the offset voltage Voff, the comparator 38 sets the output to a high level and if the voltage across the overcurrent detection resistor 36 exceeds the offset voltage Voff, the comparator 38 sets the output to a low level. This is the content of the overcurrent detection signal Visd.

In addition to the clock signal CK0 generated by the clock generator 9 and the output Vcomp of the comparator 7, the overcurrent detection signal Visd output by the comparator 38 is input to a gate control circuit 39, the numeral of which is changed. A gate control signal provided to the PMOS transistor 1 by the gate control circuit 39 is set as Vgate2.

Figure 5:
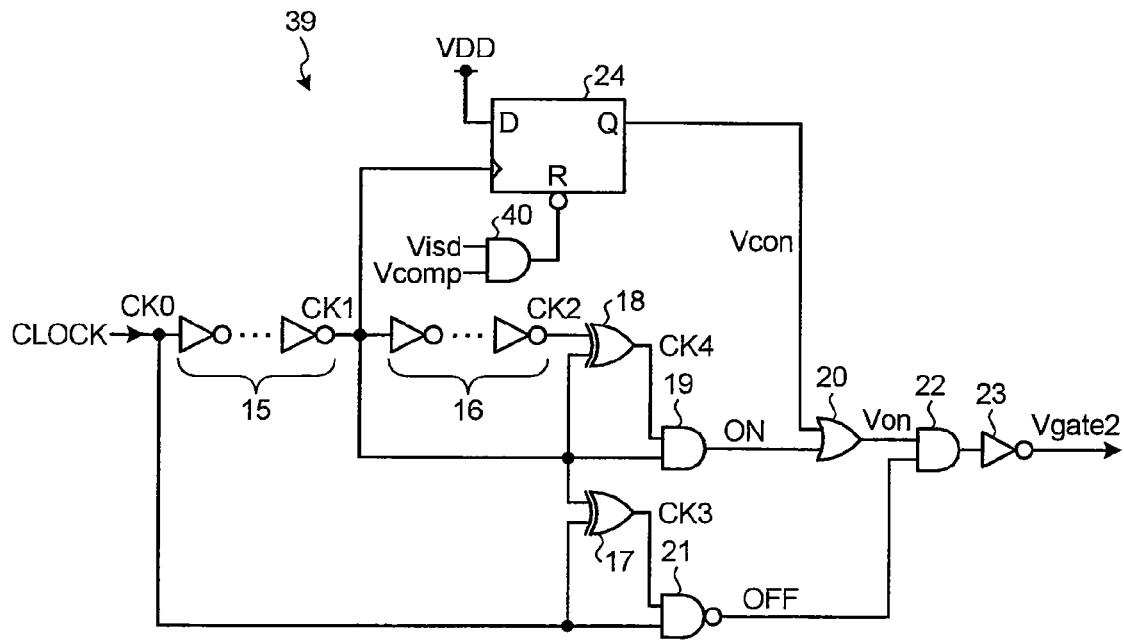
FIG. 5 is a circuit diagram showing a configuration example of the gate control circuit shown in FIG. 4.

FIG. 5 is a circuit diagram showing a configuration example of the gate control circuit 39 shown in FIG. 4. As shown in FIG. 5, the gate control circuit 39 has a configuration changed from the gate control circuit 8 shown in FIG. 2 by adding an AND circuit 40 so that the flip-flop circuit 24 is reset by the output of the AND circuit 40 taking the comparison result Vcomp of the comparator 7 and the overcurrent detection signal Visd as input.

Figure 6:
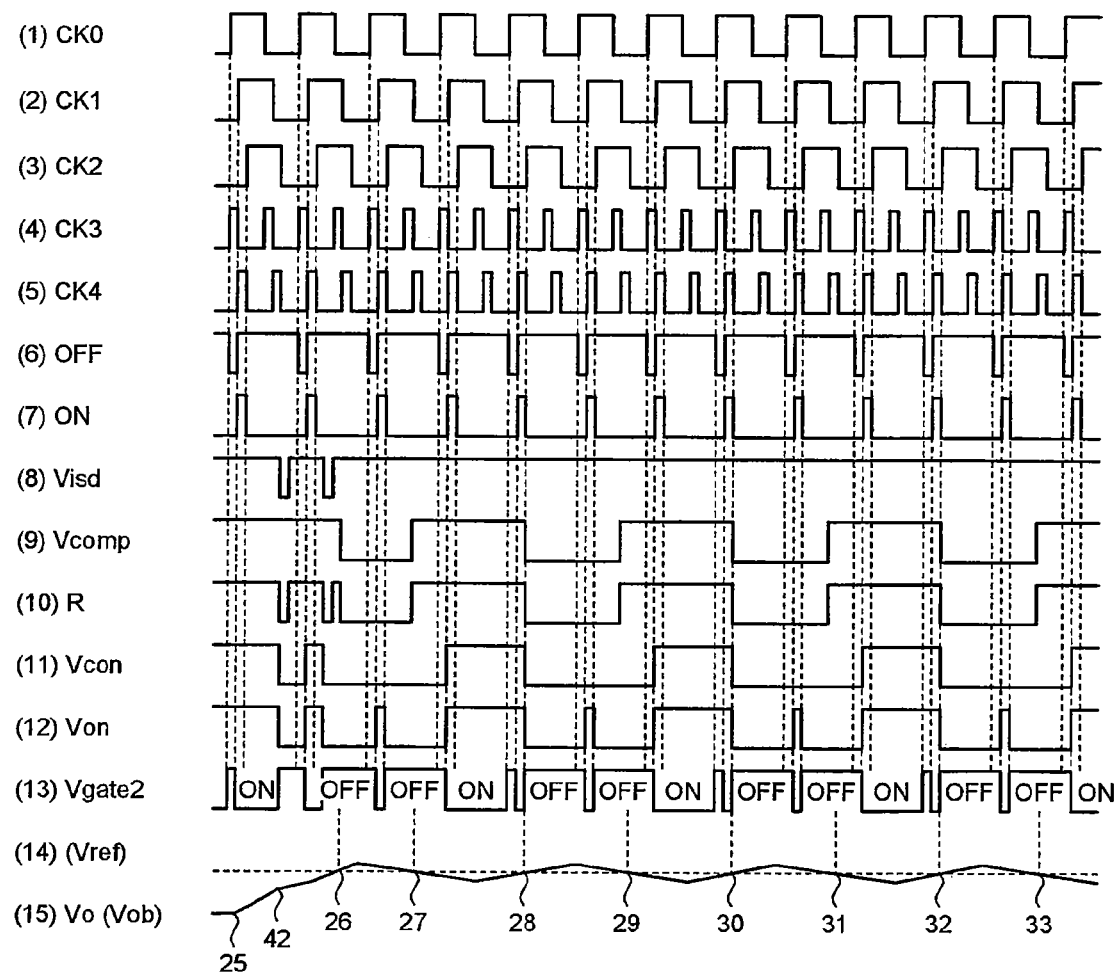
FIG. 6 is a timing chart illustrating operations of the gate control circuit shown in FIG. 4 having the configuration shown in FIG. 5.

Next, operations of the portion related to the second embodiment will be described with reference to FIG. 6. FIG. 6 is a timing chart illustrating operations of the gate control circuit shown in FIG. 4 having the configuration shown in FIG. 5. FIG. 6 has items "Visd" and "R (reset input of the flip-flop circuit 24)" concerning the second embodiment added to the timing chart shown in FIG. 3 and also shows the gate control signal Vgate2.

In FIG. 6, when the comparator 38 detects an overcurrent in timing 42, which is at some midpoint between the starting timing 25 of a voltage conversion operation and the timing 26 when the output voltage Vo (Vob) exceeds the predetermined voltage Vref, the comparator 38 causes the overcurrent detection signal Visd to fall to a low level for a short time (FIG. 6(8)). Then, the flip-flop circuit 24 is reset and the output Vcon is caused to fall to a low level, which is maintained till the leading edge (rise) of the clock signal CK1 input after the overcurrent being detected (FIG. 6(11)). While the output Vcon of the flip-flop circuit 24 is at a low level, the pseudo-comparison signal Von output from the OR circuit 20 is also at a low level (FIG. 6(12)).

As a result, the gate control signal Vgate2 by output of the AND circuit 22 is at a high level only in a time width obtained by adding a low-level period of the output Vcon of the flip-flop circuit 24 and a low-level period of the output signal OFF of the NOT-AND circuit 21 during which the PMOS transistor 1 performs the OFF operation.

Then, when the PMOS transistor 1 starts the ON operation, the comparator 38 detects an overcurrent (FIG. 6(8)). Accordingly, the flip-flop circuit 24 is reset and the output Vcon is caused to fall to a low level, which is maintained till the rise of the clock signal CK1 input after the overcurrent being detected, to be at a low level (FIG. 6((11)). However, this timing is near the timing 26 to enter stability control and the pseudo-comparison signal Von changes to a high level at a rising edge of the next clock signal CK1 (FIG. 6(12)) and thus, the PMOS transistor 1 performs the ON operation.

Thereafter, no overcurrent is detected and the pseudo-comparison signal Von is generated based on the comparison result Vcomp of the comparator 7 to perform operations described in the first embodiment (FIG. 6(9) to FIG. 6(15)).

According to the second embodiment, as described above, if an overcurrent is detected in the process of a conversion operation, the OFF operation of a switching element (PMOS transistor) is performed so that burning of a choke coil can be prevented.

Figure 7:
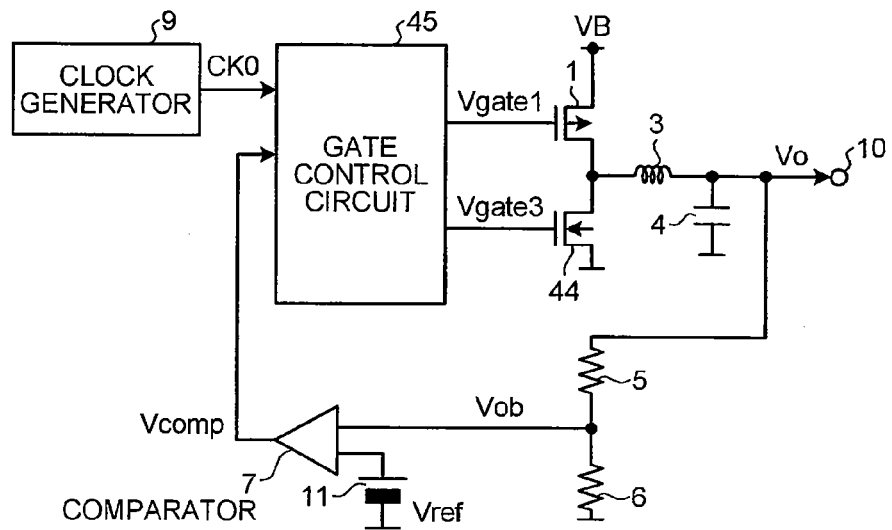
FIG. 7 is a block diagram showing a configuration example of the step-down switching power supply provided with the switching power supply control apparatus according to a third embodiment.

FIG. 7 is a block diagram showing a configuration example of the step-down switching power supply provided with the switching power supply control apparatus according to the third embodiment. In FIG. 7, the same numerals are attached to components identical to or equivalent to those shown in FIG. 1 (first embodiment). Here, the description focuses on a portion related to the third embodiment.

As shown in FIG. 7, the step-down switching power supply provided with the switching power supply control apparatus according to the third embodiment has an NMOS transistor 44, instead of the diode 2, and a gate control circuit 45, instead of the gate control circuit 8, provided in the configuration shown in FIG. 1 (first embodiment). Otherwise, the configuration is the same as that shown in FIG. 1 (first embodiment).

Figure 8:
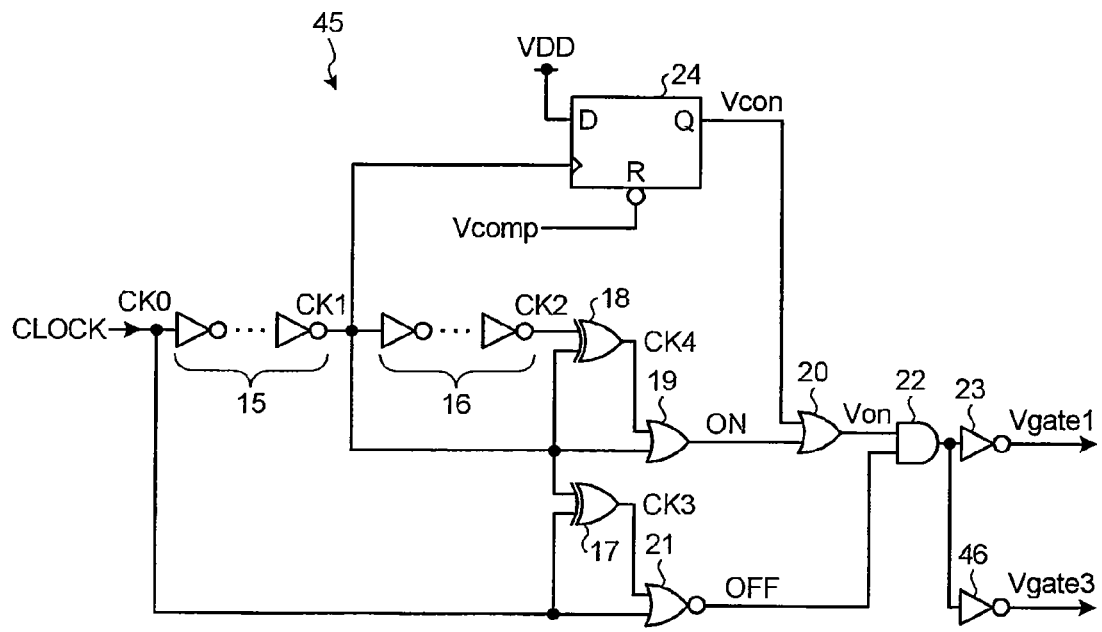
FIG. 8 is a circuit diagram showing a configuration example of the gate control circuit shown in FIG. 7.

FIG. 8 is a circuit diagram showing a configuration example of the gate control circuit shown in FIG. 7. As shown in FIG. 8, the gate control circuit 45 is configured by adding a NOT circuit 46 to an output terminal of the AND circuit 22 in parallel with the NOT circuit 23. The output of the NOT circuit 23 is, like in FIG. 1, the gate control signal Vgate1. The NOT circuit 46 outputs a gate control signal Vgate3 for the NMOS transistor 44. The NOT circuit 46 also serves to shift the level of output voltage of the AND circuit 22 in accordance with the operating voltage of the NMOS transistor 44.

That is, the gate control circuit 45 causes the PMOS transistor 1 and the NMOS transistor 44 to complementarily perform the ON/OFF operation by outputting the gate control signal Vgate1 to the PMOS transistor 1, which is the first switching element, and the gate control signal Vgate3 to the NMOS transistor 44, which is the second switching element, based on the output Vcomp of the comparator 7 and the clock signal CK1 output by the clock generator 9.

The gate control circuit 45 generates, like the gate control circuit 8 shown in FIG. 2, the gate control signal (Vgate1=Vgate3) according to the procedure described in FIG. 3 and thus, the same operations/effects as those in the first embodiment can be gained also in the third embodiment.

In addition, in the first embodiment, the current flowing through the PMOS transistor 1 flows to the ground through the diode 2 when the PMOS transistor 1 performs the OFF operation, which increases power losses and makes less efficient under light load conditions. In the third embodiment, by contrast, the NMOS transistor 44 performs the ON operation while the PMOS transistor 1 performs the OFF operation, providing advantages of less power losses and thus, improved voltage conversion efficiency under light load conditions.

Figure 9:
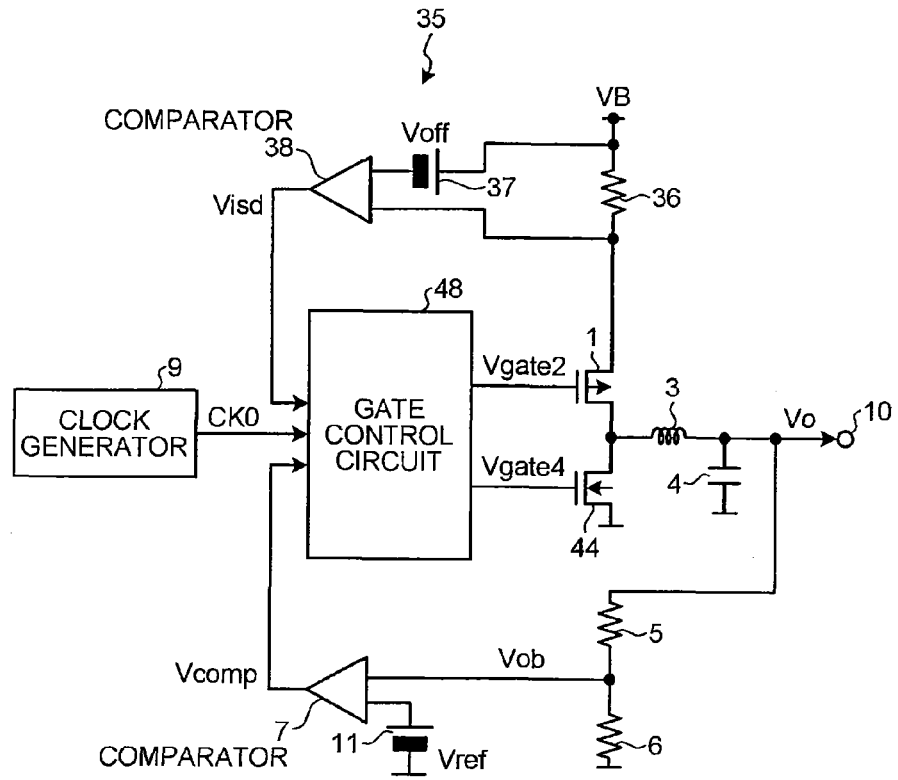
FIG. 9 is a block diagram showing a configuration example of the step-down switching power supply provided with the switching power supply control apparatus according to a fourth embodiment.

FIG. 9 is a block diagram showing a configuration example of the step-down switching power supply provided with the switching power supply control apparatus according to the fourth embodiment. The step-down switching power supply provided with the switching power supply control apparatus according to the fourth embodiment has the overcurrent detection circuit 35 shown in FIG. 4 (second embodiment) and a gate control circuit 48, instead of the gate control circuit 45, provided in the configuration shown in FIG. 7 (third embodiment).

Figure 10:
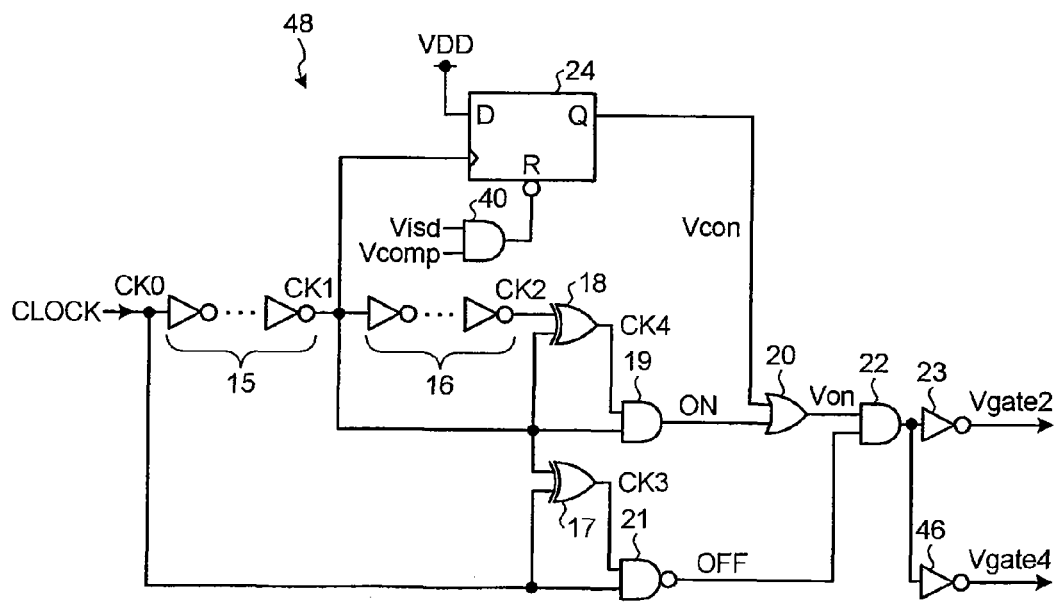
FIG. 10 is a circuit diagram showing a configuration example of the gate control circuit shown in FIG. 9.

The gate control circuit 48 has, in addition to the clock signal CK0 generated by the clock generator 9 and the output Vcomp of the comparator 7, the overcurrent detection signal Visd output by the comparator 38 input thereto and, with the configuration shown in, for example, FIG. 10, outputs the gate control signal Vgate2 to the PMOS transistor 1 and a gate control signal Vgate4 to the NMOS transistor 44.

FIG. 10 is a circuit diagram showing a configuration example of the gate control circuit 48 shown in FIG. 9. As shown in FIG. 10, the gate control circuit 48 is configured by inputting the output of the AND circuit 40 to which the comparison result Vcomp of the comparator 7 and the overcurrent detection signal Visd are input to the reset terminal R of the flip-flop circuit 24 in the gate control circuit 45 shown in FIG. 8. This configuration is a configuration obtained by adding the NOT circuit 46 in parallel with the NOT circuit 23 to the configuration of the gate control circuit 39 shown in FIG. 5.

Therefore, according to the fourth embodiment, like the second embodiment, burning of a choke coil by an overcurrent caused in the process of a conversion operation can be prevented.

Figure 11:
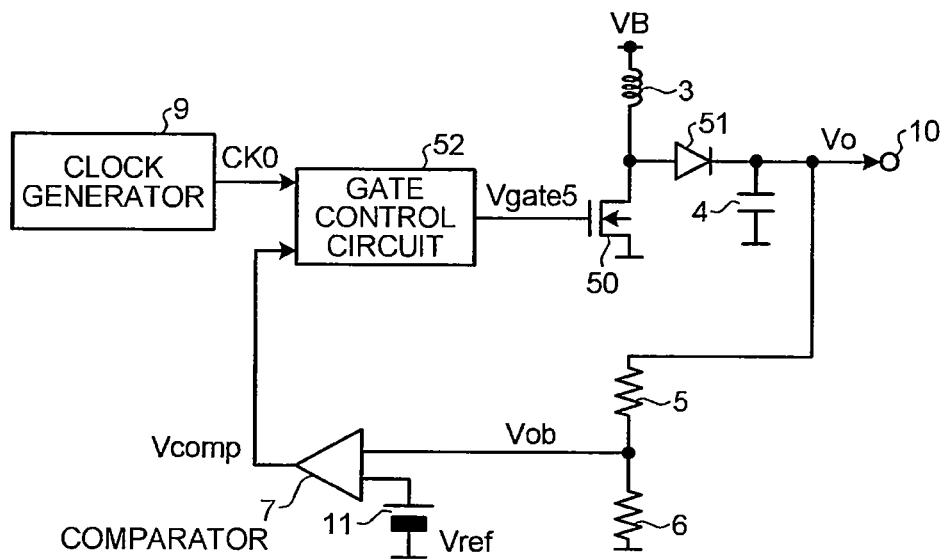
FIG. 11 is a block diagram showing a configuration example of a step-up switching power supply provided with the switching power supply control apparatus according to a fifth embodiment.

FIG. 11 is a block diagram showing the configuration of a step-up switching power supply provided with the switching power supply control apparatus according to the fifth embodiment. In FIG. 11, the same numerals are attached to components identical to or equivalent to those shown in FIG. 1 (first embodiment).

In FIG. 11, the step-up switching power supply is the same as the step-down switching power supply shown in FIG. 1 (first embodiment) in terms of components, but the polarity of the transistor, which is the first switching element, and arrangement positions of the choke coil and the diode, which is the second switching element, are different. The first switching element is an NMOS transistor 50. One end of the choke coil 3 is connected to the DC power supply VB and the other end to the drain terminal of the NMOS transistor 50. The source terminal of the NMOS transistor 50 is connected to the ground. Then, the anode terminal of a diode 51, which is the second switching element for the prevention of back-flow, is connected to a connection end of the drain terminal of the NMOS transistor 50 and the choke coil 3, and the capacitor 4 for smoothing and the series circuit of the resistors 5 and 6 constituting a voltage divider are provided in parallel between the connection line of the cathode terminal of the diode 51 and the output terminal 10 and the ground.

One input of the comparator 7 is the divided voltage Vob output by the series circuit of the resistors 5 and 6 and the other input is the reference voltage Vref generated by the voltage source 11. A gate control circuit 52 to which the comparison result Vcomp of the comparator 7 and the clock signal CK0 output by the clock generator 9 are input generates, with the configuration shown in, for example, in FIG. 12, a gate control signal Vgate5 to be provided to the NMOS transistor 50.

To make an understanding of the fifth embodiment easier, the basic operation of the step-up switching power supply shown in FIG. 11 will briefly be described while ignoring the gate control circuit 52 according to the fifth embodiment. The basic operation is an operation that if the NMOS transistor 50 repeats the ON operation and OFF operation of a predetermined time, the output voltage Vo of a predetermined value produced by stepping up the voltage of the DC power supply VB is obtained at the output terminal 10.

To realize the basic operation, the NMOS transistor 50 should perform the ON operation while the comparison result Vcomp of the comparator 7 shows that the divided voltage Vob<reference voltage Vref holds and the OFF operation while the comparison result Vcomp shows that the divided voltage Vob>reference voltage Vref holds. Then, the operations shown below will be performed in the ON operation time and OFF operation time of the NMOS transistor 50.

In the ON operation time of the NMOS transistor 50, the current flows in the direction of the DC power supply VB→the choke coil 3→the NMOS transistor 50→the ground. Current energy is stored in the choke coil 3. The diode 51 serves to prevent back-flow.

When the NMOS transistor 50 performs the OFF operation, the voltage of a current input end of the choke coil 3 is fixed to the voltage of the DC power supply VB and thus, the potential at a current output end of the choke coil 3 rises to attempt to maintain the current value immediately before so that the diode 51 is caused to perform the ON operation and the current flows in the direction of the DC power supply VB→the choke coil 3→the diode 51→the output terminal 10 to charge the capacitor 4.

Since the voltage of the current input end of the choke coil 3 is fixed to the voltage of the DC power supply VB, power is supplied from the current output end of the choke coil 3 to the output terminal 10 as if to add a voltage so that the voltage across the capacitor 4, that is, the output voltage Vo rises beyond the voltage of the DC power supply VB.

However, according to the control method by which the NMOS transistor 50 is caused to perform the ON operation while the comparison result Vcomp of the comparator 7 shows that the divided voltage Vob<the reference voltage Vref holds and the OFF operation while the comparison result Vcomp shows that the divided voltage Vob>the reference voltage Vref holds, a problem as described in the first embodiment occurs.

Figure 12:
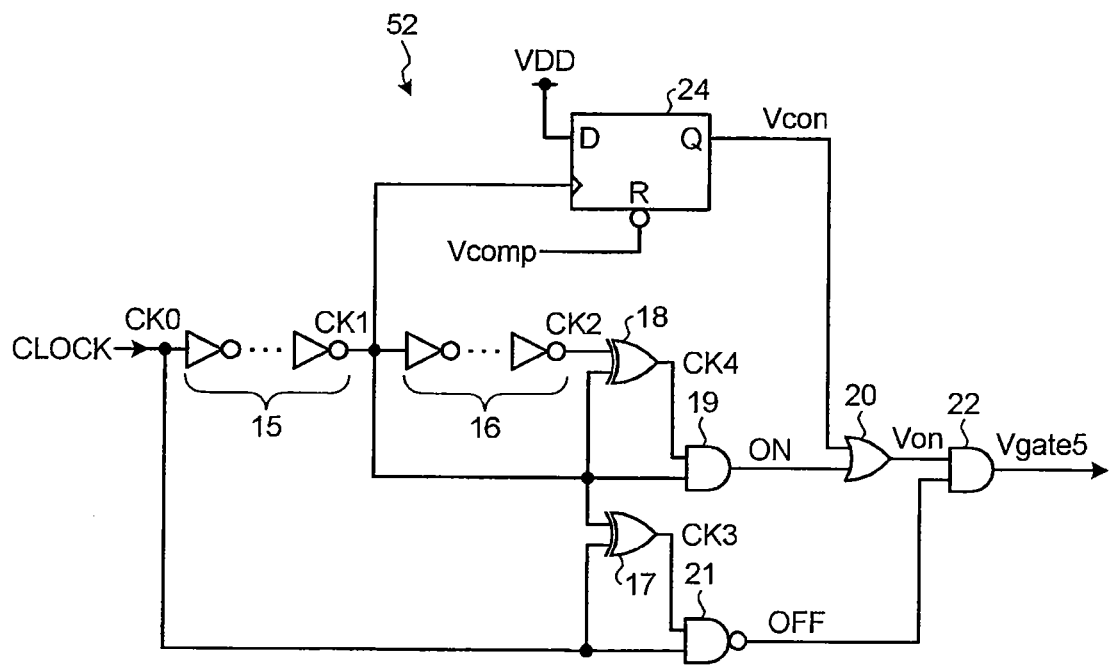
FIG. 12 is a circuit diagram showing a configuration example of the gate control circuit shown in FIG. 11.
Figure 13:
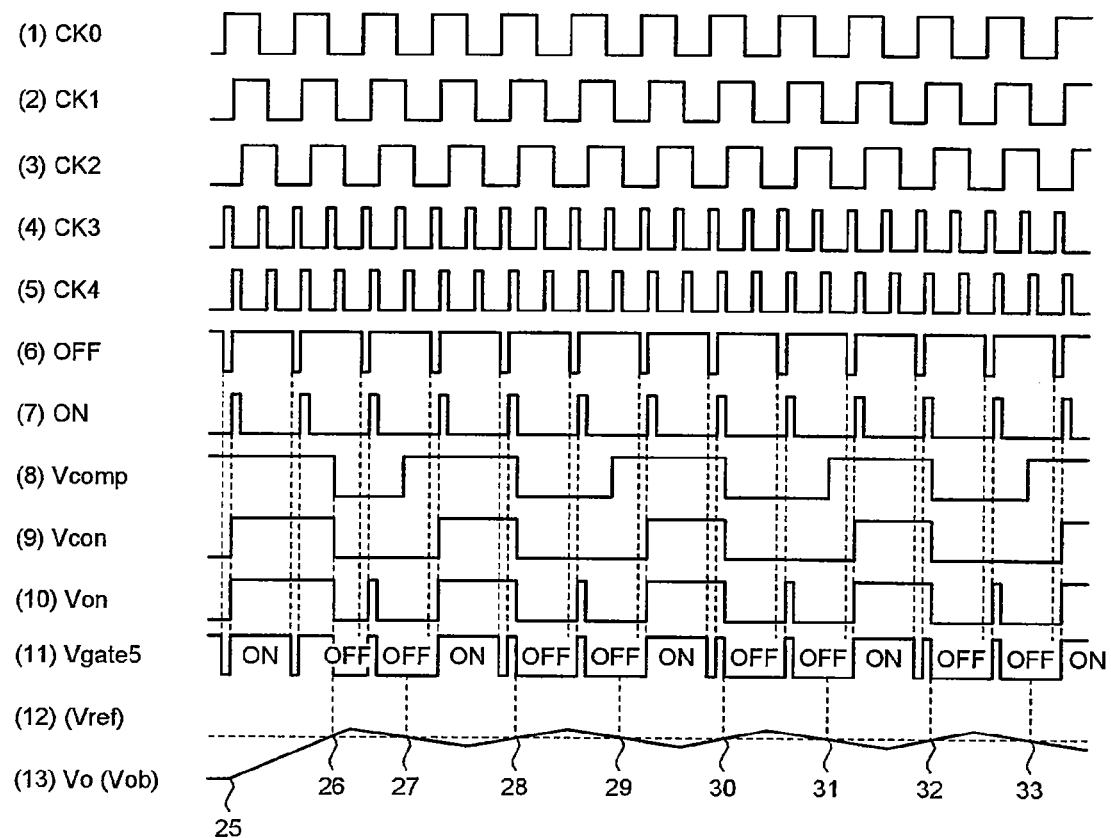
FIG. 13 is a timing chart illustrating operations of the gate control circuit shown in FIG. 11 having the configuration shown in FIG. 12.

Thus, in the fifth embodiment, the gate control circuit 52 is configured based on the idea described in the first embodiment (FIG. 12) and like in the first embodiment, the NMOS transistor 50 is enabled to exercise ON/OFF control within a period of a signal level at which the comparison result Vcomp of the comparator 7 causes the NMOS transistor 50 to perform the ON operation and within a period of the signal level at which the comparison result Vcomp causes the NMOS transistor 50 to perform the OFF operation so that the switching frequency changes as little as possible even if operating conditions change such as when the load abruptly changes (FIG. 13). FIG. 12 is a circuit diagram showing a configuration example of the gate control circuit shown in FIG. 11. FIG. 13 is a timing chart illustrating operations of the gate control circuit shown in FIG. 11 having the configuration shown in FIG. 12.

As shown in FIG. 12, the gate control circuit 52 has the NMOS transistor 50 as a switching element and thus has a configuration obtained by omitting the NOT circuit 23 in the output stage and the output of the AND circuit 22 is set as the gate control signal Vgate5 in the configuration of the gate control circuit 8 shown in FIG. 2. Therefore, the operation of the gate control circuit 52 is different from that of the gate control circuit 8 in that, as shown in FIG. 13 (11), the gate control signal Vgate5 is a signal obtained by logically inverting the gate control signal Vgate1 (FIG. 3(11)) and otherwise, the operation of the gate control circuit 52 is as described in FIG. 2.

Thus, according to the fifth embodiment, a switching element (NMOS transistor) can always be caused to perform the ON/OFF operation in each period of a clock signal regardless of the state of comparator output in a period from the start to the end of a voltage conversion operation (step-up operation) under certain conditions and therefore, a situation in which the ON operation time or OFF operation time will continue does not arise even if operating conditions change such as when operating conditions are changed from a heavy load to a light load or no load, or rising characteristics or falling characteristics of a used DC power supply are slow so that fluctuations in switching frequency can significantly be reduced. Consequently, fluctuations of generated harmonic frequencies decrease so that a step-up switching power supply from which higher harmonics is easily removable can be configured.

Figure 14:
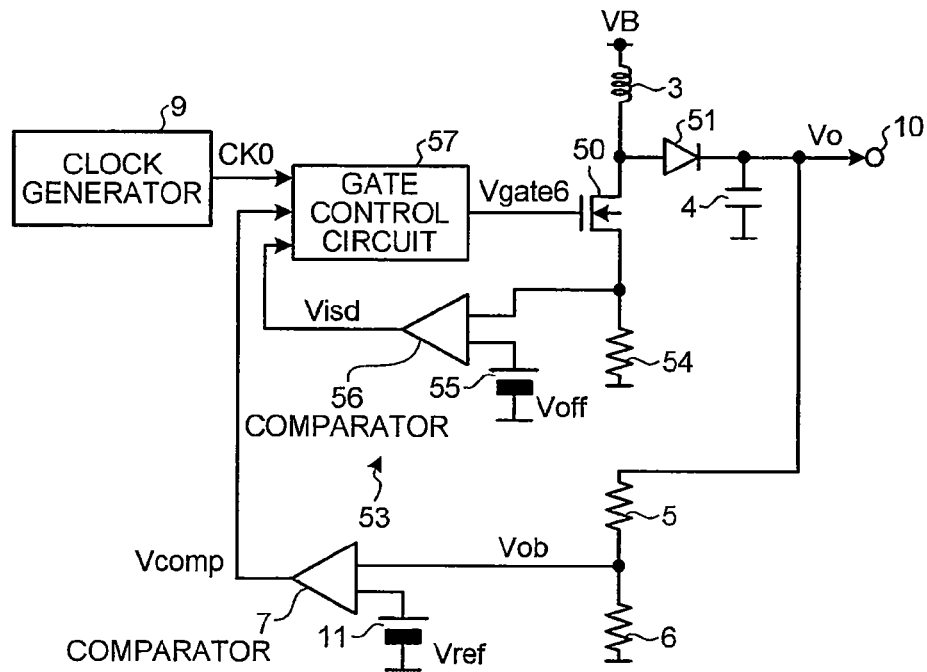
FIG. 14 is a block diagram showing a configuration example of the step-up switching power supply provided with the switching power supply control apparatus according to a sixth embodiment.

FIG. 14 is a block diagram showing a configuration example of the step-up switching power supply provided with the switching power supply control apparatus according to the sixth embodiment. In the sixth embodiment, a configuration example in which an overcurrent detection circuit to prevent burning of a choke coil caused by an excessive current is provided is shown. In FIG. 14, the same numerals are attached to components identical to or equivalent to those shown in FIG. 11 (fifth embodiment). Here, the description focuses on a portion related to the sixth embodiment.

In FIG. 14, an overcurrent detection circuit 53 includes an overcurrent detection resistor 54, a voltage source 55, and a comparator 56. The overcurrent detection resistor 54 is provided between the source terminal of the NMOS transistor 50 and the ground. One input terminal of the comparator 56 is connected to the connection line of the overcurrent detection resistor 54 and the source terminal of the NMOS transistor 50 and the other input terminal to the voltage source 55. The voltage source 55 generates the offset voltage Voff.

Like the comparator 38 shown in FIG. 4 (second embodiment), the comparator 56 compares the voltage across the overcurrent detection resistor 54 with the offset voltage Voff generated by the voltage source 55 and outputs the overcurrent detection signal Visd. If the voltage across the overcurrent detection resistor 54 does not exceed the offset voltage Voff, the comparator 56 sets the output to a high level and if the voltage across the overcurrent detection resistor 54 exceeds the offset voltage Voff, the comparator 56 sets the output to a low level. This is the content of the overcurrent detection signal Visd.

In addition to the clock signal CK0 generated by the clock generator 9 and the output Vcomp of the comparator 7, the overcurrent detection signal Visd output by the comparator 56 is input to a gate control circuit 57, the numeral of which is changed. A gate control signal provided to the NMOS transistor 50 by the gate control circuit 57 is set as Vgate6.

Figure 15:
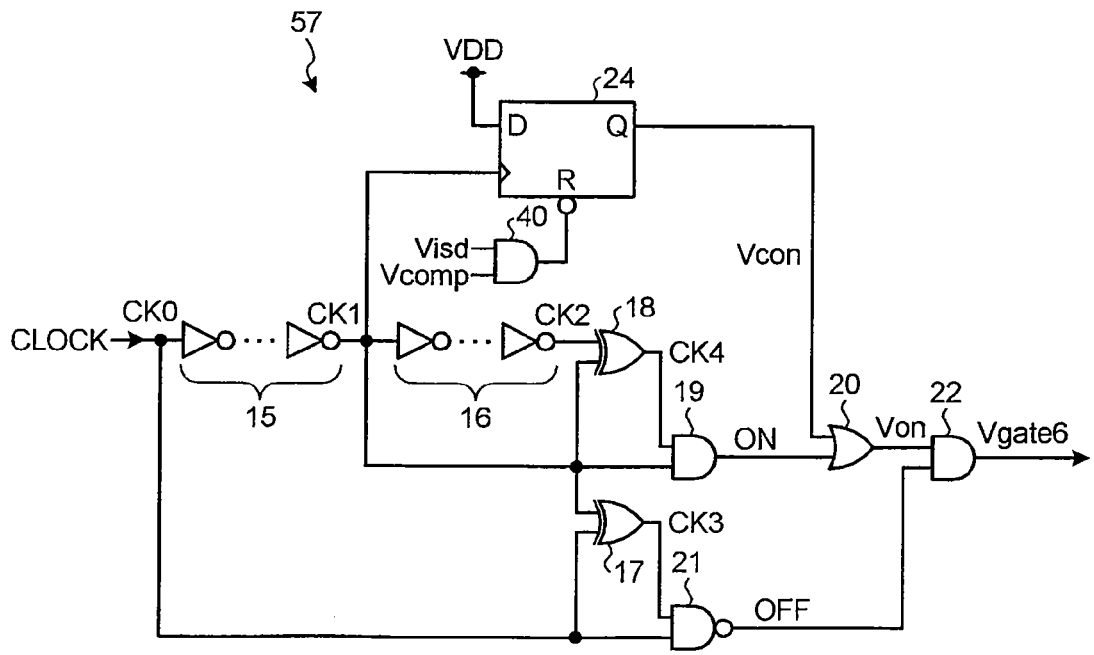
FIG. 15 is a circuit diagram showing a configuration example of the gate control circuit shown in FIG. 14.

FIG. 15 is a circuit diagram showing a configuration example of the gate control circuit shown in FIG. 14. As shown in FIG. 15, the gate control circuit 57 is configured by inputting the output of the AND circuit 40 to which the comparison result Vcomp of the comparator 7 and the overcurrent detection signal Visd are input to the reset terminal R of the flip-flop circuit 24 in the gate control circuit 45 shown in FIG. 12. This configuration is a configuration similar to that of the gate control circuit 39 shown in FIG. 5 (second embodiment).

Figure 16:
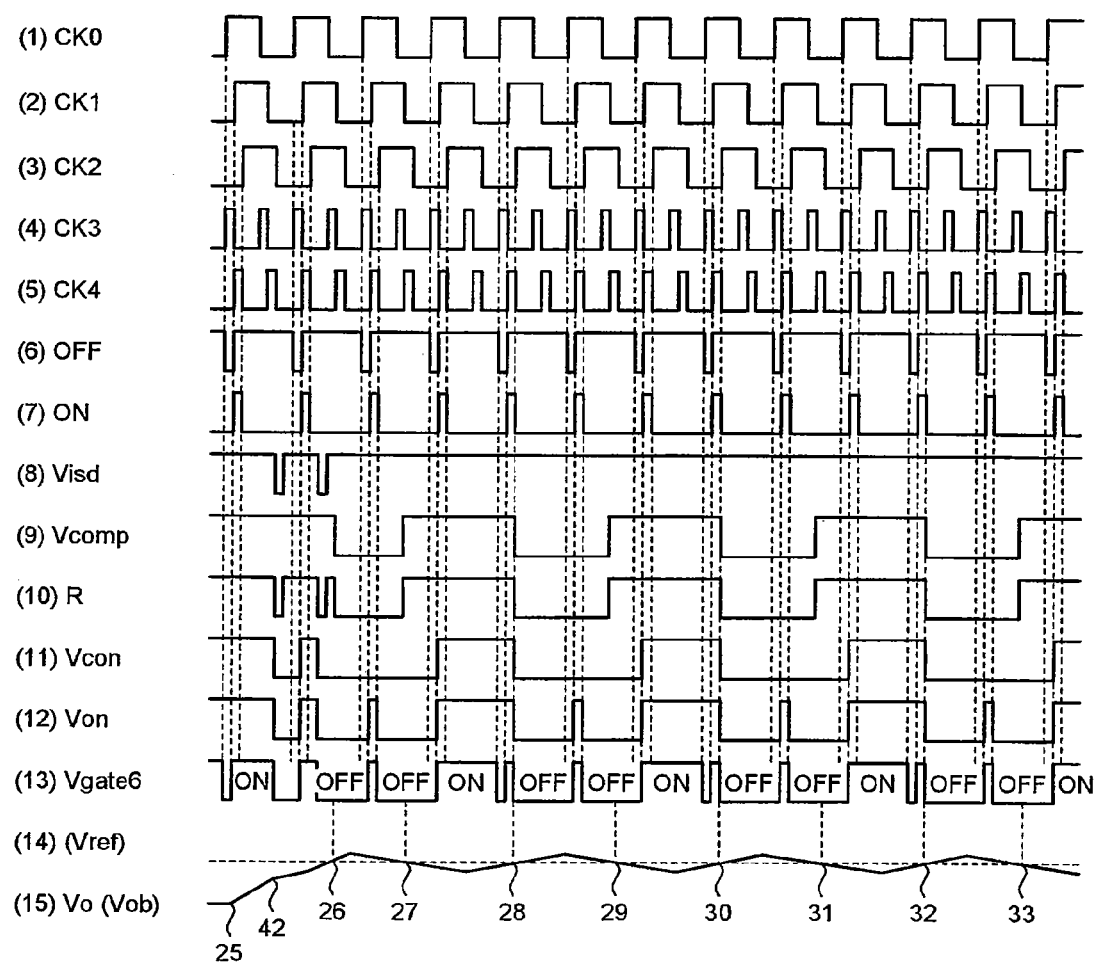
FIG. 16 is a timing chart illustrating operations of the gate control circuit shown in FIG. 14 having the configuration shown in FIG. 15.

Next, operations of the portion related to the sixth embodiment will be described with reference to FIG. 16. FIG. 16 is a timing chart illustrating operations of the gate control circuit shown in FIG. 14 having the configuration shown in FIG. 15. FIG. 16 has the items "Visd" and "R" concerning the sixth embodiment added to the timing chart shown in FIG. 13. Content thereof is the same as that shown in FIG. 6 (second embodiment).

Therefore, according to the sixth embodiment, like the second embodiment, burning of a choke coil by an overcurrent caused in the process of a conversion operation can be prevented.

Figure 17:
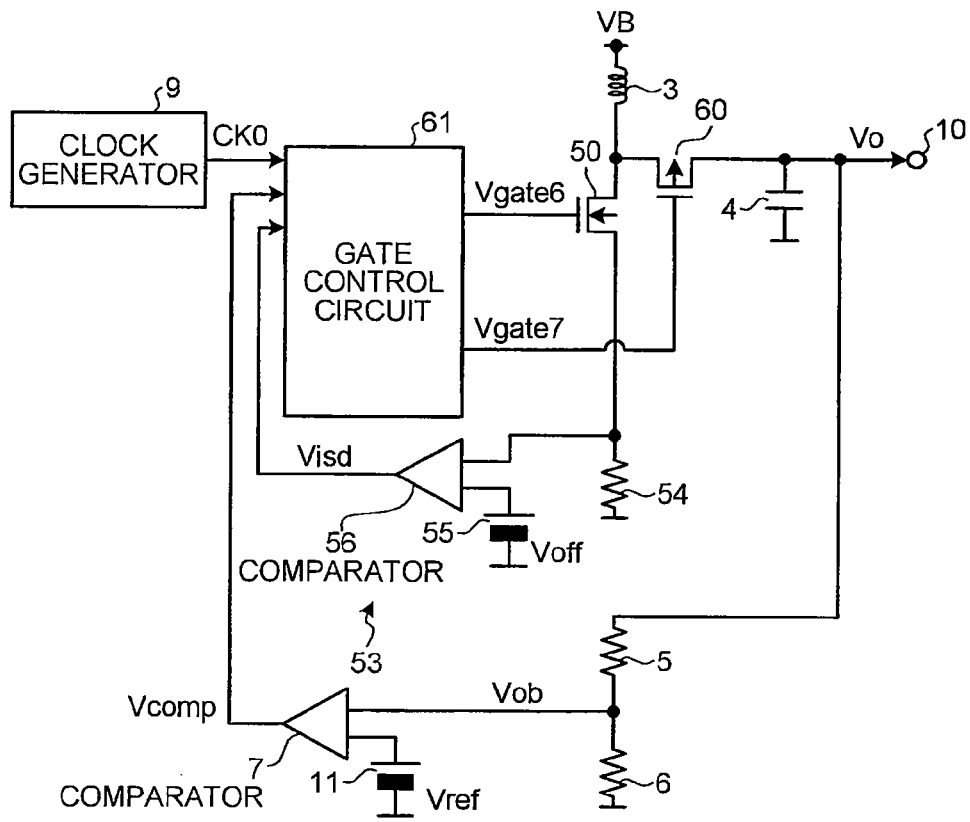
FIG. 17 is a block diagram showing a configuration example of the step-up switching power supply provided with the switching power supply control apparatus according to a seventh embodiment.

FIG. 17 is a block diagram showing a configuration example of the step-up switching power supply provided with the switching power supply control apparatus according to the seventh embodiment. In FIG. 17, the same numerals are attached to components identical to or equivalent to those shown in FIG. 14 (sixth embodiment). Here, the description focuses on a portion related to the seventh embodiment.

As shown in FIG. 17, the step-up switching power supply provided with the switching power supply control apparatus according to the seventh embodiment has a PMOS transistor 60, instead of the diode 51, and a gate control circuit 61, instead of the gate control circuit 57, provided in the configuration shown in FIG. 14 (sixth embodiment). Otherwise, the configuration is the same as that shown in FIG. 14 (sixth embodiment).

The gate control circuit 61 generates the gate control signal Vgate6 and a gate control signal Vgate7 that cause the NMOS transistor 50, which is the first switching element, and the PMOS transistor 60, which is the second switching element, to complementarily perform the ON/OFF operation based on the output Vcomp of the comparator 7, the clock signal CK0 output by the clock generator 9, and the output Visd of the comparator 56. That is, the gate control signal Vgate6 and the gate control signal Vgate7 have the same content and are the gate control signal Vgate6 itself output by the gate control circuit 57 in FIG. 14 (sixth embodiment).

More specifically, the gate control circuit 61 is configured by branching output of the AND circuit 22 in the output stage into Vgate6 and Vgate7 in the configuration of the gate control circuit 57 shown in FIG. 15.

According to the seventh embodiment, the same operations/effects as those in the sixth embodiment can be gained. In addition, in the sixth embodiment, the current flowing through the NMOS transistor 50 flows to the output terminal 10 through the diode 51 when the NMOS transistor 50 performs the OFF operation, which causes power losses in the diode 51. In the seventh embodiment, by contrast, the PMOS transistor 60 performs the ON operation while the NMOS transistor 50 performs the OFF operation, improving voltage conversion efficiency while causing almost no power loss.

An application example to the sixth embodiment is shown in the seventh embodiment, but a similar application can be made to the fifth embodiment. That is, a configuration obtained by providing a PMOS transistor, instead of the diode 51, in the configuration shown in FIG. 11 and the output of the AND circuit 22 is branched into two, one of which provided to the NMOS transistor 50 and the other to the PMOS transistor, in the configuration of the gate-control circuit 52 shown in FIG. 12 can be adopted.

Figure 18:
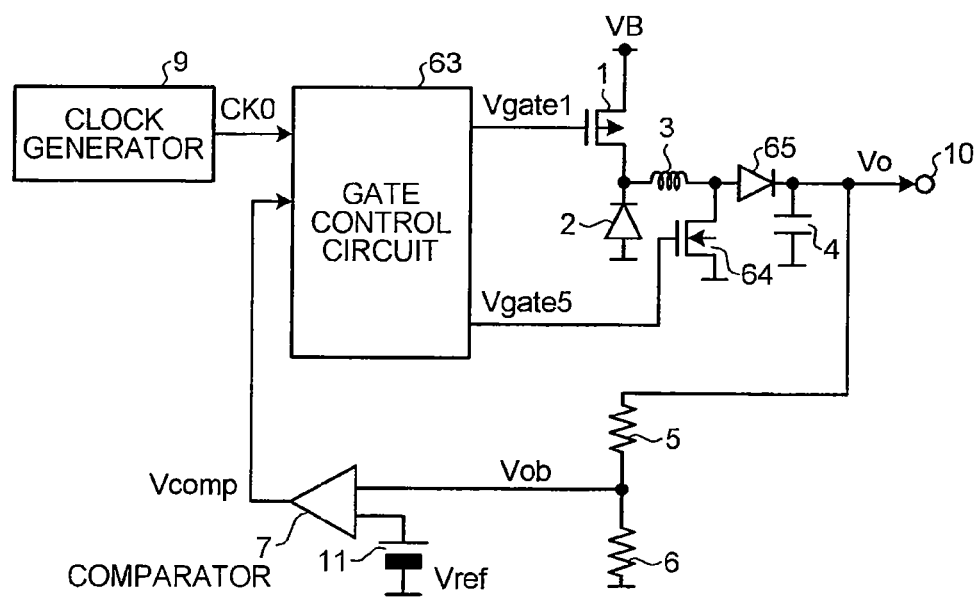
FIG. 18 is a block diagram showing a configuration example of a step-down and step-up switching power supply provided with the switching power supply control apparatus according to an eighth embodiment.

FIG. 18 is a block diagram showing a configuration example of a step-down and step-up switching power supply provided with the switching power supply control apparatus according to the eighth embodiment. In FIG. 18, the same numerals are attached to components identical to or equivalent to those shown in FIG. 1 (first embodiment). Here, the description focuses on a portion related to the eighth embodiment.

In FIG. 18, the step-down and step-up switching power supply provided with the switching power supply control apparatus according to the eighth embodiment has a gate control circuit 63, instead of the gate control circuit 8, and additionally an NMOS transistor 64 and a diode 65 for backflow prevention on a path from the current output end of the choke coil 3 to the output terminal 10 provided in the configuration shown in FIG. 1 (first embodiment). The NMOS transistor 64 and the diode 65 correspond to a third switching element and a fourth switching element respectively.

The source terminal of the NMOS transistor 64 is connected to the ground, the drain terminal thereof is connected to the current output end of the choke coil 3 together with anode terminal of the diode 65, and the gate control signal Vgate5 is applied to the gate terminal thereof from the gate control circuit 63. The cathode terminal of the diode 65 is connected to the connection end of the capacitor 4 on a path to the output terminal 10.

In the configuration of the gate control circuit 8 shown in FIG. 2 (first embodiment), the gate control circuit 63 fetches the output from the NOT circuit 23 as the gate control signal Vgate1 to the PMOS transistor 1 and the output from the AND circuit 22 as the gate control signal Vgate5 to the NMOS transistor 64. The configuration to fetch the latter gate control signal Vgate5 is shown in FIG. 12 (fifth embodiment).

That is, a step-down and step-up switching power supply provided with the switching power supply control apparatus according to the eighth embodiment always performs the step-down and step-up operations by causing the PMOS transistor 1 and the NMOS transistor 64 to perform the ON/OFF operation simultaneously. The simultaneous ON/OFF operation is always performed in each period of the clock signal CK0 regardless of the state of comparator output in a period from the start to the end of a step-down and step-up operation under certain conditions. Since a situation in which the ON operation time or OFF operation time will continue does not arise even if operating conditions change such as when operating conditions are changed from a heavy load to a light load or no load, or rising characteristics or falling characteristics of a used DC power supply are slow so that fluctuations in switching frequency can significantly be reduced. Consequently, fluctuations of generated harmonic frequencies decrease so that a step-down and step-up switching power supply from which higher harmonics is easily removable can be configured.

In the eighth embodiment, while an application example to a switching power supply used always for performing a step-down and step-up operation is shown, it is needless to say that an application can also be made to a switching power supply that switches to perform a step-down operation and a step-up operation. That is, a case where a step-down operation and a step-up operation are switched and performed can be shown for the configuration shown in FIG. 18 as follows. For the step-down operation, the PMOS transistor 1 is caused to perform the ON/OFF operation by putting the NMOS transistor 64 to an OFF operation state. For the step-up operation, the NMOS transistor 64 is caused to perform the ON/OFF operation by putting the PMOS transistor 1 to an ON operation state. While this description assumes a case where the step-down operation and the step-up operation are specified from outside and performed, an example in which the step-down operation and the step-up operation are automatically performed will be shown as the ninth embodiment.

Figure 19:
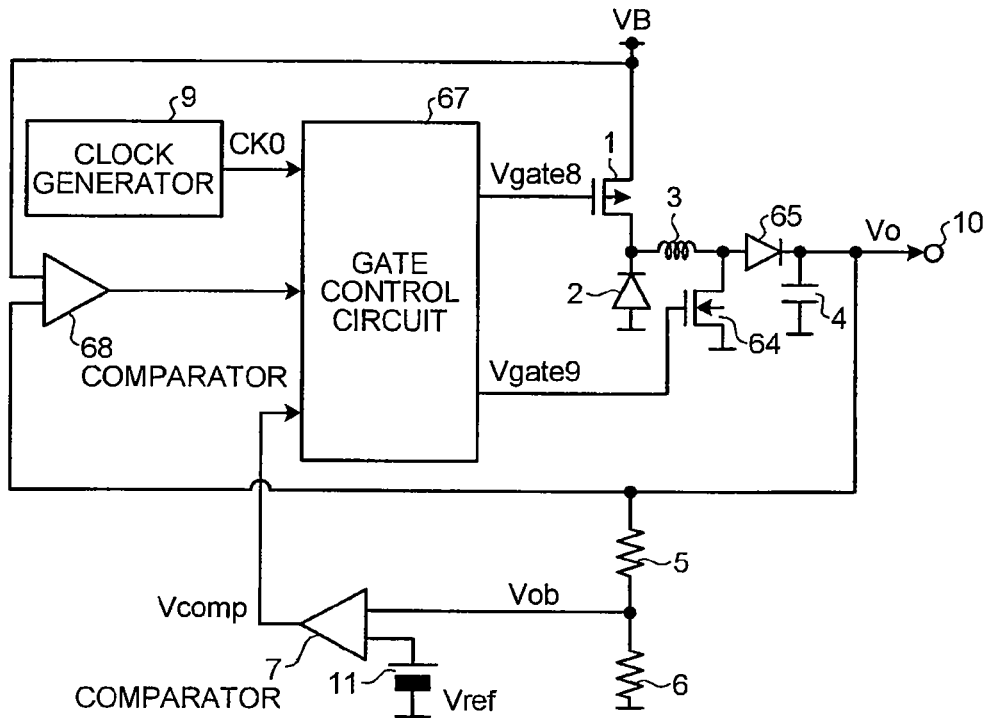
FIG. 19 is a block diagram showing a configuration example of the step-down and step-up switching power supply provided with the switching power supply control apparatus according to a ninth embodiment.

FIG. 19 is a block diagram showing a configuration example of the step-down and step-up switching power supply provided with the switching power supply control apparatus according to the ninth embodiment. In FIG. 19, the same numerals are attached to components identical to or equivalent to those shown in FIG. 18 (eighth embodiment). Here, the description focuses on a portion related to the ninth embodiment.

In FIG. 19, the step-down and step-up switching power supply provided with the switching power supply control apparatus according to the ninth embodiment has a gate control circuit 67, instead of the gate control circuit 63, and additionally a comparator 68 provided in the configuration shown in FIG. 18 (eighth embodiment).

The comparator 68 compares the voltage of the DC power supply VB with the desired output voltage Vo in magnitude and outputs a comparison result thereof to the gate control circuit 67. Based on each comparison result of the comparators 7 and 68, the gate control circuit 67 generates each of a gate control signal Vgate8 to be provided to the PMOS transistor 1 and a gate control signal Vgate9 to be provided to the NMOS transistor 64.

Here, the DC power supply VB is an accumulator. The voltage of an accumulator shows the maximum voltage when fully charged and falls as the accumulator is used. Thus, the gate control circuit 67 automatically switches and performs the step-down operation and the step-up operation as described below. A concrete configuration example of the gate control circuit 67 can easily be estimated and thus, an illustration thereof is omitted.

If the comparison result of the comparator 68 shows that the voltage of the DC power supply VB>the output voltage Vo holds, the gate control circuit 67 puts the NMOS transistor 64 to the OFF operation state while maintaining the gate control signal Vgate9 at a low level and causes the PMOS transistor 1 to perform the ON/OFF operation to step down the voltage of the DC power supply VB to the desired output voltage Vo. The gate control signal Vgate8 provided to the PMOS transistor 1 is the gate control signal Vgate1 shown in FIG. 18 (FIG. 3).

On the other hand, if the comparison result of the comparator 68 shows that the voltage of the DC power supply VB<the output voltage Vo holds, the gate control circuit 67 puts the PMOS transistor 1 to the ON operation state while maintaining the gate control signal Vgate8 at a low level and causes the NMOS transistor 64 to perform the ON/OFF operation to step up the voltage of the DC power supply VB to the desired output voltage Vo. The gate control signal Vgate9 provided to the NMOS transistor 64 is the gate control signal Vgate5 shown in FIG. 18 (FIG. 13).

According to the ninth embodiment, as described above, the output voltage can appropriately be controlled to a desired value in accordance with a voltage drop due to aged deterioration of a DC power supply.

Figure 20:
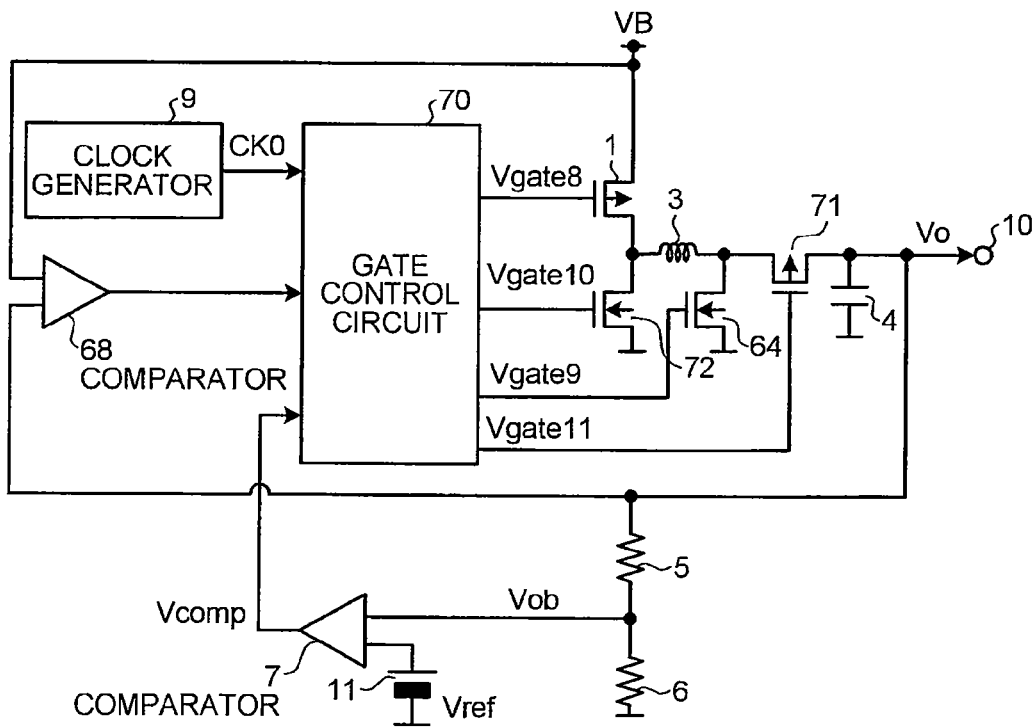
FIG. 20 is a block diagram showing a configuration example of the step-down and step-up switching power supply provided with the switching power supply control apparatus according to a tenth embodiment.

FIG. 20 is a block diagram showing a configuration example of the step-down and step-up switching power supply provided with the switching power supply control apparatus according to the tenth embodiment. In FIG. 20, the same numerals are attached to components identical to or equivalent to those shown in FIG. 19 (ninth embodiment). Here, the description focuses on a portion related to the tenth embodiment.

In FIG. 20, the step-down and step-up switching power supply provided with the switching power supply control apparatus according to the tenth embodiment has a gate control circuit 70, instead of the gate control circuit 67, a PMOS transistor 71, instead of the diode 65, and an NMOS transistor 72, instead of the diode 2, provided in the configuration shown in FIG. 19 (ninth embodiment).

With the above configuration, if the comparison result of the comparator 68 shows that the voltage of the DC power supply VB>the output voltage Vo holds, the gate control circuit 70 puts the NMOS transistor 64 to the OFF operation state while maintaining the gate control signal Vgate9 at a low level and at the same time, puts the PMOS transistor 71 to the ON operation state while maintaining a gate control signal Vgate11 at a low level, provides the gate control signal Vgate8 (the gate control signal Vgate1 shown in FIG. 7 (FIG. 8)) to the PMOS transistor 1, and provides the gate control signal Vgate10 (the gate control signal Vgate3 shown in FIG. 7 (FIG. 8)) to the NMOS transistor 72 to cause both to complementarily perform the ON/OFF operation to step down the voltage of the DC power supply VB to the desired output voltage Vo.

On the other hand, if the comparison result of the comparator 68 shows that the voltage of the DC power supply VB<the output voltage Vo holds, the gate control circuit 67 puts the PMOS transistor 1 to the ON operation state while maintaining the gate control signal Vgate8 at a low level and at the same time, puts the NMOS transistor 72 to the OFF operation state while maintaining a gate control signal Vgate10 at a low level, provides the gate control signal Vgate9 (the gate control signal Vgate5 shown in FIG. 13) to the NMOS transistor 64, and provides the gate control signal Vgate11 (the gate control signal Vgate1 shown in FIG. 3) to the PMOS transistor 71 to cause both to complementarily perform the ON/OFF operation to step up the voltage of the DC power supply VB to the desired output voltage Vo.

According to the tenth embodiment, power losses can be reduced regardless of whether a step-down operation or a step-up operation is performed and thus, voltage conversion efficiency of a step-down and step-up switching power supply can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching power supply control apparatus that controls a switching power supply having first and second switching elements connected in series between a DC power supply and a ground in which a voltage produced by stepping down the voltage of the DC power supply is formed at an output terminal by a current that flows through a node between the two switching elements, the switching power supply control apparatus comprising:
    a comparator configured to compare a voltage proportional to an output voltage with a reference voltage;
    a clock generator configured to generate a clock signal; and
    a control circuit connected to the comparator and the clock generator and configured to generate a first delayed clock signal obtained by delaying the clock signal by a first time delay that is less than a half period of the clock signal and a second delayed clock signal obtained by delaying the clock signal by a second time delay that is greater than the first time delay and less than the half period of the clock signal, and to generate a control signal based on a comparison result of the comparator and the first and second delayed clock signals, the control signal causing the first switching element on a side of the DC power supply to perform an ON/OFF operation at least once in each period of the clock signal.

2. The switching power supply control apparatus according to claim 1, wherein the second switching element includes a diode that is turned on when the first switching element is turned off, and wherein the control circuit includes:
    a serial two-stage delay circuit configured to sequentially output the first and second delayed clock signals;
    a flip-flop circuit having a data input terminal to which a power supply voltage is input, a clock terminal to which the first delayed clock signal is input, and a reset terminal to which the comparison result of the comparator is input;
    a first exclusive OR circuit having the clock signal and the first delayed clock signal input thereto;
    a second exclusive OR circuit having the first delayed clock signal and the second delayed clock signal input thereto;
    a first AND circuit having the first delayed clock signal and an output of the second exclusive OR circuit input thereto;
    an OR circuit having an output of the flip-flop circuit and an output of the first AND circuit input thereto;
    a NOT-AND circuit having the clock signal and an output of the first exclusive OR circuit input thereto;
    a second AND circuit having an output of the OR circuit and an output of the NOT-AND circuit input thereto; and
    a NOT circuit having an output of the second AND circuit input thereto to output the control signal.

3. The switching power supply control apparatus according to claim 1,
    wherein the second switching element includes a diode that is a turned on when the first switching element is turned off,
    wherein the switching power supply control apparatus further comprises an overcurrent detection circuit configured to determine whether the current flowing through the first switching element is an overcurrent, and
    wherein the control signal causes the first switching element to perform an OFF operation when the overcurrent detection circuit detects the overcurrent.

4. The switching power supply control apparatus according to claim 1, wherein the control circuit is further configured to generate control signals that cause the first switching element and the second switching element to complementarily perform the ON/OFF operation at least once in each period of the clock signal.

5. The switching power supply control apparatus according to claim 1, further comprising:
  an overcurrent detection circuit configured to determine whether the current flowing through the first switching element is an overcurrent,
  wherein the control signal causes the first switching element and the second switching element to complementarily perform the ON/OFF operation at least once in each period of the clock signal, and
  wherein the first switching element is caused to perform an OFF operation when the overcurrent detection circuit detects the overcurrent.

6. The switching power supply control apparatus according to claim 1, further comprising:
  a third switching element connected along a path from the node between the first and second switching elements toward the output terminal and a ground; and
  a fourth switching element that is connected between the third switching element and the output terminal, wherein a voltage produced by stepping down or stepping up the voltage of the DC power supply is formed at the output terminal by at least the current that flows through the node between the first and second switching elements,
  wherein the control signal is further based on a comparison result of the first comparator and the clock signal, the control signal causing at least one of the first switching element or the third switching element to perform the ON/OFF operation at least once in each period of the clock signal.

7. The switching power supply control apparatus according to claim 6, wherein the control signal causes the first switching element and the second switching element to complementarily perform the ON/OFF operation at least once in each period of the clock signal, and causes the third switching element and the fourth switching element to complementarily perform the ON/OFF operation at least once in each period of the clock signal.

8. The switching power supply control apparatus according to claim 6,
  wherein the second switching element includes a diode that is turned on when the first switching element is turned off,
  wherein the fourth switching element includes a diode that is turned on when the third switching element is turned off,
  wherein the switching power supply control apparatus further comprises a second comparator configured to compare the output voltage with the voltage of the DC power supply,
  wherein the control signal causes the first switching element to perform the ON/OFF operation at least once in each period of the clock signal by setting the third switching element to an OFF state when, based on a comparison result of the second comparator, the voltage of the DC power supply is greater than the output voltage, and
  wherein the control signal causes the first switching element and the third switching element to complementarily perform the ON/OFF operation at least once in each period of the clock signal when, based on a comparison result of the second comparator, the voltage of the DC power supply is less than the output voltage.

9. The switching power supply control apparatus according to claim 6, further comprising:
  a second comparator configured to compare the output voltage with the voltage of the DC power supply,
  wherein the control signal causes the first switching element and the second switching element to complementarily perform the ON/OFF operation at least once in each period of the clock signal by setting the third switching element to an OFF and the fourth switching element to an ON operation state when, based on a comparison result of the second comparator, the voltage of the DC power supply is greater than the output voltage,
  wherein the control signal causes the first switching element and the second switching element to complementarily perform the ON/OFF operation at least once in each period of the clock signal, and causes the third switching element and the fourth switching element to complementarily perform the ON/OFF operation at least once in each period of the clock signal when, based on a comparison result of the second comparator, the voltage of the DC power supply is less than the output voltage.

10. The switching power supply control apparatus according to claim 6,
  wherein the second switching element arranged on the side of the ground includes a diode that is turned on when the first switching element is turned off,
  wherein the fourth switching element includes a diode that is turned on when the third switching element is turned off,
  wherein the control signal causes the first switching element to perform the ON/OFF operation at least once in each period of the clock signal by setting the third switching element to an OFF state for a step-down operation, and
  wherein the control signal causes the third switching element to perform the ON/OFF operation at least once in each period of the clock signal by setting the first switching element to an ON state for a step-up operation.

11. The switching power supply control apparatus according to claim 6,
  wherein the control signal causes the first switching element and the second switching element to complementarily perform the ON/OFF operation at least once in each period of the clock signal by setting the third switching element to an OFF state and the fourth switching element to an ON state for a step-down operation, and
  wherein the control signal causes the third switching element and the fourth switching element to complementarily perform the ON/OFF operation at least once in each period of the clock signal by setting the first switching element to an ON state and the second switching element to an OFF state for a step-up operation.

12. A switching power supply control apparatus that controls a switching power supply having a first switching element having a first end that is connected to ground and a second switching element that is connected to a second end of the first switching element, wherein the second switching element is arranged along a path between a DC power supply and an output terminal in which a voltage produced by stepping up the voltage of the DC power supply is formed at the output terminal by a current flowing from the second end of the first switching element through the second switching element and to the output terminal, the switching power supply control apparatus comprising:

a comparator configured to compare a voltage proportional to an output voltage at the output terminal with a reference voltage;

a clock generator configured to generate a clock signal; and a control circuit configured to generate a first delayed clock signal obtained by delaying the clock signal by a first time delay that is less than a half period of the clock signal and a second delayed clock signal obtained by delaying the clock signal by a second time delay that is greater than the first time delay and less than the half period of the clock signal, and to generate a control signal based on a comparison result of the comparator and the first and second delayed clock signals, the control signal causing the first switching element to perform an ON/OFF operation at least once in each period of the clock signal.

13. The switching power supply control apparatus according to claim 12, wherein the second switching element includes a diode that is turned on when the first switching element is turned off, and wherein the control circuit includes:

a serial two-stage delay circuit configured to sequentially output the first and second delayed clock signals;

a flip-flop circuit having a data input terminal to which a power supply voltage is input, a clock terminal to which the first delayed clock signal is input, and a reset terminal to which the comparison result of the comparator is input;

a first exclusive OR circuit having the clock signal and the first delayed clock signal input thereto;

a second exclusive OR circuit having the first delayed clock signal and the second delayed clock signal input thereto;

a first AND circuit having the first delayed clock signal and an output of the second exclusive OR circuit input thereto;

an OR circuit having an output of the flip-flop circuit and an output of the first AND circuit input thereto;

a NOT-AND circuit having the clock signal and an output of the first exclusive OR circuit input thereto; and a second AND circuit having an output of the OR circuit and an output of the NOT-AND circuit input thereto to output the control signal.

14. The switching power supply control apparatus according to claim 12, wherein the control circuit is further configured to generate control signals that cause the first switching element and the second switching element to complementarily perform the ON/OFF operation at least once in each period of the clock signal.

15. The switching power supply control apparatus according to claim 12, wherein the second switching element includes a diode that is turned on when the first switching element is turned off, wherein the switching power supply control apparatus further comprises an overcurrent detection circuit configured to determine whether the current flowing through the first switching element is an overcurrent, and wherein the control signal causes the first switching element to perform an OFF operation when the overcurrent detection circuit detects the overcurrent.

16. The switching power supply control apparatus according to claim 12, further comprising: an overcurrent detection circuit configured to determine whether the current flowing through the first switching element is an overcurrent or not, wherein the control signal causes the first switching element and the second switching element to complementarily perform the ON/OFF operation at least once in each period of the clock signal and, when the overcurrent detection circuit detects the overcurrent, the first switching element is caused to perform an OFF operation.

17. A switching power supply, comprising:

a first switching element having a first end that is connected to a DC power supply;

a diode having a cathode terminal that is connected to a second end of the first switching element and an anode terminal that is connected to ground;

a choke coil having a first end that is connected to a node between the first switching element and the diode and having a second end connected to an output terminal;

a capacitor arranged between the ground and the second end of the choke coil, so as to be charged by an output voltage arising at the output terminal;

a comparator configured to compare a voltage proportional to the output voltage with a reference voltage;

a clock generator configured to generate a clock signal; and a control circuit connected to the comparator and the clock generator and configured to generate a first delayed clock signal obtained by delaying the clock signal by a first time delay that is less than a half period of the clock signal and a second delayed clock signal obtained by delaying the clock signal by a second time delay that is greater than the first time delay and less than the half period of the clock signal, and to generate a control signal based on a comparison result of the comparator and the first and second delayed clock signals, the control signal causing the first switching element to perform an ON/OFF operation at least once in each period of the clock signal.

* * * * *